Patented June 6, 1944

2,350,800

UNITED STATES PATENT OFFICE 2,350,800

PROCESS OF PRODUCING STABLE AQUEOUS WAX EMULSIONS

Adalbert Müller, Augsburg, Germany; vested in the Alien Property Custodian

No Drawing. Application May 8, 1941, Serial No. 392,534

6 Claims. (Cl. 252—311.5)

My copending patent application Serial No. 327,344, filed April 1, 1940 contains inter alia the description of the production of aqueous emulsions of waxes, fats, oils, and other fatty substances, which, if they have a low acid value, are thoroughly mixed with aqueous solutions of basic salts of aluminium or tetravalent metals. It is not necessary to add protective colloids.

The subject of the present process is the emulsification of waxes derived from high-molecular fatty acids with about 22 and more carbon atoms, especially with about 26 to 30 carbon atoms, principally such as the lignite waxes. In this case, the emulsification will be possible even if the waxes have a higher acid value, for example 50 to 70. Such waxes may, therefore, also be emulsified in the simple and cheap manner described in the aforesaid patent application.

The emulsification may also be effected with mixtures of salts of aluminium and tetravalent metals, and the waxes may be diluted with organic solvents. Furthermore, hydrocarbons, such as paraffin, may also be used in the emulsification. Among the salts of tetravalent metals, principally those of zirconium, thorium, titanium, and uranium, are suitable for the purpose. As organic solvents there are used especially chlorinated hydrocarbons.

*Example No. 1.*—19 kgs. of a basic solution of aluminium formate, containing 16% of aluminium oxide and 18% of formic acid, are placed in a turbo-mixer and are heated to 60° C. Then there is added a solution, heated to 70° C., of 2.5 kgs. of a lignite wax (acid value 85, saponification value 90, melting point 75° C.) in 1 to 2 kgs. of perchlorethylene under constant stirring. After a short time, the resulting emulsion will get thick, whereupon 20 litres of warm water of 40° C. are slowly added, and then the substance is stirred cold. The emulsion is stable and may readily be diluted with water.

*Example No. 2.*—1 kg. of crystallized zirconium oxychloride and 0.4 kg. of crystallized sodium acetate are dissolved in 3 litres of water while being heated, and then the solution heated to 60° C. is mixed in a turbo-mixer with 5 kgs. of a mineral wax with an acid value of 60. There results an emulsion which may be diluted with water.

*Example No. 3.*—An emulsion will also be formed by melting 1.5 kgs. of a mixture of about equal parts of paraffin and ceresin with 1 kg. of a high-molecular wax with an acid value of 70, and by pressing it, together with 5 kgs. of a warm solution of aluminium acetate (6% aluminium oxide), through a homogenizing nozzle. After some water has been added, the resulting emulsion is stirred cold. It may be diluted as desired, and if it forms cream in the diluted state, this may be easily removed by stirring.

What is claimed, is:

1. Process for producing an aqueous emulsion which is stable in concentrated and in dilute condition free from protective colloids, which consists in intimately mixing a wax in liquid form and having an acid number from 50 to about 85 and consisting essentially of esters of high molecular fatty acids with at least 22 carbon atoms, with an aqueous solution of a water soluble basic organic salt of aluminum.

2. Process for producing an aqueous emulsion which is stable in concentrated and in dilute condition free from protective colloids, which consists in intimately mixing a perchlorethylene solution of a wax having an acid number of from 50 to about 85 and consisting essentially of esters of high molecular fatty acids with at least 22 carbon atoms, with an aqueous solution of a water soluble basic organic salt of aluminum.

3. Process for producing an aqueous emulsion which is stable in concentrated and in dilute condition free from protective colloids, which consists in intimately mixing a wax in liquid form, having an acid number of from 50 to about 85 and consisting essentially of esters of high molecular fatty acid with at least 22 carbon atoms and paraffin, with an aqueous solution of a water soluble basic organic salt of aluminum.

4. Process for producing an aqueous emulsion which is stable in concentrated and in dilute condition free from protective colloids, which consists in intimately mixing a wax in liquid form and having an acid number of from 50 to about 85 and consisting essentially of esters of high molecular fatty acids with at least 22 carbon atoms, with an aqueous solution comprising 1 kg. of crystallized zirconium oxychloride and 0.4 kg. of crystallized sodium acetate dissolved in 3 litres of water.

5. Process for producing an aqueous emulsion which is stable in concentrated and in dilute condition free from protective colloids, which consists in dissolving a lignite wax of acid value about 50 in perchlorethylene, and intimately mixing the solution with a basic aqueous solution of aluminum formate.

6. Process for producing an aqueous emulsion which is stable in concentrated and in dilute condition free from protective colloids, which consists in intimately incorporating by a homogenizing operation a molten mixture of substantially ¾ part of paraffin, ¾ part of ceresin and 1 part of a high molecular wax having an acid value of substantially 70, with 5 parts of a warm basic solution of aluminum acetate, said aluminum acetate comprising aluminum in the proportion substantially corresponding to 6 per cent of aluminum oxide, all of the foregoing proportions being by weight.

ADALBERT MÜLLER.